United States Patent Office 3,305,545
Patented Feb. 21, 1967

3,305,545
3-LOWER ALKYL ENOLETHERS OF 3-KETO-2-CARBOXY STEROIDS AND DERIVATIVES THEREOF
Pietro de Ruggieri, Carmelo Gandolfi, and Umberto Guzzi, Milan, Italy, assignors to Ormonoterapia Richter S.p.A., Milan, Italy, a corporation of Italy
No Drawing. Filed July 6, 1964, Ser. No. 380,640
Claims priority, application Italy, July 5, 1963, 14,024/63; June 9, 1964, 12,668/64
3 Claims. (Cl. 260—211.5)

The present invention relates to the 3-alkyl-enol-ethers of steroidal 2-carboxy-acids and to the derivatives thereof, having the following formula:

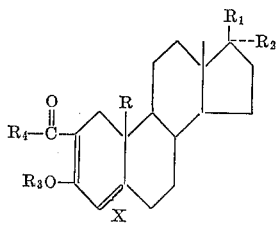

where R is a member selected from the group comprising hydrogen and methyl; $R_1$ is a member selected from the group comprising hydroxy, acyloxy and $C_8H_{17}$ (this latter being a 2-methyl-isohepty group); $R_2$ is a member selected from the group comprising hydrogen and a lower alkyl; $R_3$ is a straight or branched alkyl radical having up to 4 carbon atoms; $R_4$ is a member selected from the group comprising OH, OMe, OEt, $CH_3$, Cl, $NH_2$, CNS, CNO,

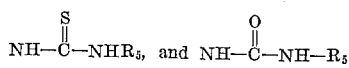

$R_5$ is a member of the group comprising hydrogen, alkyl of from 1 to 6 carbon atoms, ribosyl, 2′, 3′, 5′-tri-O-benzoyl-ribosyl, 2′-deoxyribosyl and 3′,5′-di-O-benzoyl-2′-deoxy-ribosyl, X being a single or a double bond.

Such compounds have been found to be very useful for therapy of the cardiovascular diseases and hyperlipidemia and as affecting the hypophysary gonadotropic secretion.

Such compounds are also very important intermediates in the preparation of useful steroidal compounds.

The 3-keto-2-carboxy-esters are employed as starting materials and are directly obtained by the condensation of the 3-keto derivatives with diethyl-carbonate in dimethyl-sulfoxide in the presence of sodium-amide; by pyrolyzing 2-glyoxylalkoxy-3-ketones (Nelson R. A. and Schutz R. N., J. Am. Chem. Soc. 80, 6630 (1958)); (Djerassi C.; Hart P. A. and Beard, C., J. Am. Chem. Soc. 86, 85, 1964); or by alkaline saponification of 2-cyano-3-enol-ethers (U.S. appln. 214,848, August 6, 1962) or 3,3-ethyl-endioxy-steroids, these latter having been prepared through dioxolanation of 2-cyano-3-keto-steroids (U.S. appln. 279,630, filed May 10, 1963).

The invention will be better explained by the following examples which are not intended as a limitation thereof.

EXAMPLE 1

*2α-carboxyethylester-17α-methyl-5α-androstane-17β-ol-3-one*

To a solution of 17α-methyl-5α-androstane-17β-ol-3-one (3 parts) in dimethylsulphoxide (30 parts), sodium amide (3 parts) was added with stirring at room temperature. Twenty parts of a diethyl-carbonate solution in dimethylsulphoxide (1:1) were added after 20 minutes, the stirring continuing for two hours. The obtained solution was neutralized by adding a saturated monosodic-phosphate solution, thoroughly diluted and filtered. The crude product, dissolved in dimethylene chloride, was purified by chromatography on silica gel, and from the methylene chloride:benzene 6:4 fraction, 2α-carboxyethyl-ester-17α-methyl-5α-androstane-17β-ol-3-one (1.2 parts) was obtained, M.P. 166–168° C.

EXAMPLE 2

*2α-carboxymethylester-17α-methyl-5α-androstane-17β-ol-3-one*

At room temperature, sodium methoxide (1.8 parts) was added to a solution of 17α-methyl-5α-androstane-17β-ol-3-one (1.4 parts) in dimethyl-sulphoxide (15 parts) with stirring. After 30 minutes, 15 parts of a solution (1:1) of dimethylcarbonate in dimethylsulphoxide was added over a period of two hours. The thus obtained solution was neutralized with a monosodic phosphate solution, diluted with water and filtered. The crude product, dissolved in chloroform, was chromatographed on silica-gel and from the methylene chloride:benzene 5:5 fraction, 2α - carboxy - methylesther-17α-methyl-5α-androstrane-17β-ol-3-one (0.43 part) was obtained.

EXAMPLE 3

*2-cyano-3-ethoxy-17α-methyl-5α-androst-2-ene-17β-ol*

A 20% sodium hydroxide solution (7.4 parts) was added dropwise over a period of 30 minutes into a slurry of (2,3 - d) - isoxazole - 17α - methyl - 5α - androstane-17β-ol-3-one (5.28 parts) in ethanol (80 parts) and di-ethyl-sulphate (4.83 parts), the temperature being about 5° C. Stirring was carried on for two hours. The solution obtained by filtration was concentrated to a small volume, diluted with water, extracted with ether, repeatedly washed with alkali and evaporated to dryness. By crystallization from methanol, 2 - cyano - 3 - ethoxy-17α-methyl-5α-androst-2-ene-17β-ol (3.8 parts) was obtained.

EXAMPLE 4

*2-cyano-3-ethoxy-cholest-2-ene*

To a slurry of (2,3-d)-isoxazole cholestane (3.64 parts) in ethanol (60 parts), diethyl-sulphate (2.42 parts) was added; then a 20% sodium hydroxide solution (3.7 parts) was added, while the temperature was kept between 5° and 10° C. Stirring was continued for two hours; the filtered solution was evaporated to a small volume, then diluted with water, and extracted with ether. The organic phase was washed several times with alkali, then evaporated to drryness to give, after crystallization from methanol, 1.97 parts of 3-ethoxy-2-cyano-cholest-2-ene, M.P. 192–194° C. $(\alpha)_D = 77°$ (chloroform).

EXAMPLE 5

*2-cyano-3-ethoxy-cholesta-2,4-diene*

Following the process described in the above example, from 2 parts of (2,3-d)-isoxazole-cholesta-4-ene as starting material, 2-cyano-3-ethoxy-cholesta-2,4-diene (0.98 part) was obtained.

EXAMPLE 6

*2-cyano-3-ethoxy-17α-methyl-androsta-2,4-diene-17β-ol*

Following the process described in Example 4, from 4.6 parts of (2,3-d)-isoxazole-17α-methyl-androst-4-ene-17β-ol, 2 - cyano - 3 - ethoxy-17α-methyl-androsta-2,4-diene-17β-ol (3.2 parts) was obtained.

EXAMPLE 7

*2-cyano-3-ethoxy-17α-methyl-estra-2,4-diene-17β-ol*

To a slurry of 2α-cyano-17α-methyl-estr-4-ene-17β-ol-3-one (1 part) in dioxane (9 parts), was added 1 part of tri-ethyl anthofarmate, and then 0.1 part of p-toluenesulphonic acid. The mixture was kept at room temperature for 24 hours, then one part of pyridine was added and the solution was evaporated to a small volume. The mixture was diluted with ether, repeatedly extracted with alkali, washed with water and evaporated to dryness. By crystallization from methanol-ethyl ether, 2-cyano-3-ethoxy-17α-methyl-estra-2,4-diene-17β-ol (0.72 part) was obtained.

EXAMPLE 8

*2-cyano-3-ethoxy-androsta-2,4-diene-17β-ol*

The process of Example 7 was followed, except that 2α-cyano-androst-4-ene-3-one 17β-ol (2 parts) was used as starting material. 2-cyano-3-ethoxy-androsta-2,4-diene-17β-ol (1.37 parts) was obtained, M.P. 120–123° C.

EXAMPLE 9

*2-cyano-3-methoxy-cholesta-2,4-diene*

According to Example 4, from 1.8 parts of (2,3-d)-isoxazole - cholestane, 2 - cyano - 3 - methoxy - cholesta-2,4-diene (1.02 parts) was obtained by treating with dimethyl sulphate.

EXAMPLE 10

*2-cyano-3-butoxy-cholest-2-ene*

A solution of 2-cyano-cholestane-3-one (25 parts) in toluene (750 parts) was refluxed with n-butanol (90 parts) and p-toluenesulphonic-acid (1.4 parts) for 15 hours, an azeotropic mixture of water-toluene being distilled off. The solution was neutralized with pyridine (5 parts), repeatedly washed with alkali, then washed with water, and evaporated to dryness. 2-cyano-3-butoxy-cholest-2-ene (22 parts) was obtained; M.P. 140–142° C.; $(\alpha)_D = +66°$ (chloroform).

EXAMPLE 11

*2-cyano-3-butoxy-cholesta-2,4-diene*

Following the procedure of Example 10, except that 2α-cyano-cholest-4-ene-3-one (10 parts) are used, 2-cyano-3-butoxy-cholesta-2,4-diene (11.2 parts) was obtained, M.P. 120–122° C.

EXAMPLE 12

*2-cyano-3-butoxy-androsta-2,4-diene-17β-ol*

Following the procedure of Example 10, except that 2α-cyano-androst-4-ene-17β-ol-3-one (12 parts) was used 10.8 parts of 2-cyano-3-butoxy-androsta-2,4-diene-17β-ol were obtained, M.P. 102–104° C.

EXAMPLE 13

*2-cyano-3-butoxy-androsta-2,4-diene-17β-acetoxy*

2-cyano-3-butoxy-androsta-2,4-diene-17β-ol (2 parts) was dissolved in pyridine (6 parts), and acetic anhydride (3 parts) was added thereto. The solution was kept at room temperature over night, then diluted with water and filtered; by crystallization from methanol, 1.92 parts of 2 - cyano - 3 - butoxy - androsta - 2,4, - diene - 17β-acetoxy were obtained, M.P. 129–132° C.

EXAMPLE 14

*2-cyano-3-butoxy-estra-2,4-diene-17β-ol*

Following the procedure of Example 10, except that 2α-cyano-estr-4-ene-17β-ol-3-one (6.8 parts) was used, 2-cyano-3-butoxy-estra-2,4-diene-17β-ol (6.2 parts) was obtained.

EXAMPLE 15

*2-cyano-3-butoxy-17α-methyl-androsta-2,4-diene-17β-ol*

Following the procedure of Example 3, except that n-butyl iodide was substituted for diethyl sulphate from (2,3-d)-isoxazole-androst-4-ene-17β-ol (20 parts), 2-cyano-3-butoxy-17α-methyl-androsta-2,4-diene-17β-ol (12 parts) was obtained.

EXAMPLE 16

*2-carboxylic acid-3-n-butoxy-androsta-2,4-diene-17β-ol*

A solution of 12 parts of potassium hydroxide in 12 parts of water was added to a solution of 2-cyano-3-n-butoxy-androsta-2,4-diene-17β-ol-17-acetate (4 parts) in ethylene glycol (60) parts; the mixture was refluxed for 10 hours, with stirring, then cooled, diluted with water, filtered and acidified. After filtering and washing with water, 2 - carboxylic - acid - 3 - n - butoxy - androsta-2,4-diene-17β-ol (2.2 parts) was obtained, M.P. 210–212° C., by crystallization from ethyl acetate.

EXAMPLE 17

*2-carboxylic acid-3-n-butoxy-androsta-2,4-diene-17β-ol*

Following the procedure of Example 16, from 2.4 parts of 2-cyano-3-n-butoxy-androsta-2,4-diene-17β-ol were obtained 1.8 parts of 2-carboxylic acid-3-n-butoxy-androsta-2,4-diene-17β-ol; M.P. 211–212° C.

EXAMPLE 18

*2-carboxylic acid-3-n-butoxy-androsta-2,4-diene-17β-ol-17-acetate*

2-carboxylic acid-3-n-butoxy-androsta-2,4-diene-17β-ol (1 part) was dissolved in pyridine (4 parts) and 2 parts of acetic anhydride were added thereto. After 24 hours, the solution was diluted with water, acidified and filtered. After crystallization from methanol-ether, 2-carboxylic acid-3-n-butoxy-androsta-2,4-diene-17β-ol-17-acetate (1.02 parts) was obtained.

EXAMPLE 19

*2-carboxylic acid-3-n-butoxy-17α-methyl-androsta-2,4-diene-17β-ol*

The process of Example 16, was followed, except that 2 - cyano - 3 - n - butoxy - 17α - methyl - androsta - 2,4-diene-17β-ol (2 parts) was used. 2-carboxylic acid-3-n-butoxy-17α-methyl-androsta-2,4-diene-17β-ol (1.12 parts) was obtained.

EXAMPLE 20

*2-carboxylic acid-3-n-butoxy-cholesta-2,4-diene*

Following the procedure of Example 16, starting from 2-cyano-3-n-butoxy-cholesta-2,4-diene (18 parts), 2-carboxylic acid -3-n-butoxy-cholesta-2,4-diene (12 parts) was obtained.

EXAMPLE 21

*2-carboxylic acid-3-n-butoxy-estra-2,4-diene-17β-ol*

A process similar to that of Example 16, except that 2-cyano-3-n-butoxy-estra-2,4-diene-17β-ol (12 parts) was used; 2-carboxylic acid-3-n-butoxy-estra-2,4-diene-17β-ol (9.3 parts) was obtained.

EXAMPLE 22

*2-carboxylic acid-methylester-3-n-butoxy-androsta-2,4-diene-17β-ol*

To a slurry of 2-carboxylic acid-3-n-butoxy-androsta-2,4-diene-17β-ol (3.4 parts) in benzene (15 parts) was added a 2.8% diazomethane solution in ethyl ether (20 parts). The mixture was kept at room temperature for 2 hours, then evaporated to half of its volume, washed with a 5% sodium bicarbonate solution, and then with water to neutrality. By evaporating to dryness, 2-carboxylic acid - methylester - 3 - n - butoxy - androsta - 2,4-diene-17β-ol (3.2 parts) was obtained.

EXAMPLE 23

*2-carboxylic acid-methylester-3-n-butoxy-androsta-2,4-diene-17β-ol-17-acetate*

Following the procedure of Example 22, from 6.2 parts of 2 - carboxylic acid - 3 - n - butoxy - androsta - 2,4-diene-17β-ol-17-acetate, 6.01 parts of 2-carboxylic acid-methylester - 3 - n - butoxy - androsta - 2,4 - diene - 17β-ol-17-acetate were obtained.

EXAMPLE 24

*2-carboxylic acid-methylester-3-n-butoxy-estra-2,4-diene-17β-ol*

2 - carboxylic acid - methylester - 3 - n - butoxy - estra-2,4-diene-17β-ol (3.75 parts) was obtained following the procedure of Example 22, from 3.8 parts of 2-carboxylic acid-3-n-butoxy-estra-2,4-diene-17β-ol.

EXAMPLE 25

*2-carboxylic acid-methylester-3-n-butoxy-cholesta-2,4-diene*

The procedure of Example 22 was followed, except that 2-carboxylic acid-3-n-butoxy-cholesta-2,4-diene (6 parts) was used as starting material, and 2-carboxylic acid - methylester - 3 - n - butoxy - cholesta - 2,4 - diene (6.05 parts) was obtained.

EXAMPLE 26

*2-carboxylic acid-methylester-3-n-butoxy-17α-methyl-androsta-2,4-diene-17β-ol*

From 2-carboxylic acid-3-n-butoxy-17α-methyl-androsta-2,4-diene-17β-ol (6 parts), by treating with diazomethane, according to Example 22, 2-carboxylic acid-methylester - 3 - n - butoxy - 17α - methyl - androsta - 2,4-diene-17β-ol (5.87 parts) was obtained.

EXAMPLE 27

*2α-carboxylic acid-methylester-androst-4-ene-17β-ol-3-one*

2-carboxylic acid-methylester-3-n-butoxy-androsta-2,4-diene-17β-ol (3 parts) was dissolved in 10 parts of 90% acetic acid and heated for 10 minutes on a boiling water-bath. Then the mixture was diluted with water and filtered. By crystallization from ethyl ether, 2-carboxylic acid - methylester -androsta - 4 - ene - 17β - ol - 3 - one (2.05 parts) was obtained, M.P. 158–160° C.

EXAMPLE 28

*2α-carboxylic acid-methyl-ester-androst-4-ene-17β-ol-3-one-17-acetate*

2-carboxylic acid-methyl-ester-3-n-butoxy-androsta-2,4-diene-17β-ol-17-acetate (2.8 parts) was treated as in Example 27, to give 2α-carboxylic acid-methyl-ester-androst-4-ene-17β-ol-3-one-17-acetate (1.92 parts).

EXAMPLE 29

*2α-carboxylic acid-methyl-ester-17α-methyl-androst-4-ene-17β-ol-3-one*

According to Example 27, 2α-carboxylic acid-methylester-17α-methyl-androst-4-ene-17β-ol-3-one (1.23 parts) was obtained from 2-carboxylic acid-methyl-ester-3-n-butoxy-17α-methyl-androsta-2,4-diene-17β-ol (1.93 parts).

EXAMPLE 30

*2α-carboxylic acid-methyl-ester-estr-4-ene-17β-ol-3-one*

Following the process described in Example 27, 2α-carboxylic acid-methyl-ester-estr-4-ene-17β-ol-3-one (1.96 parts) was obtained from 2-carboxylic acid-methyl-ester-3-n-butoxy-estra-2,4-diene-17β-ol (3.2 parts).

EXAMPLE 31

*2α-carboxylic acid-methyl-ester-cholest-4-en-3-one*

Following the process described in Example 27, 2α-carboxylic acid - methyl - ester - cholest-4-ene-3-one (2.9 parts) was obtained from 4.9 parts of 2-carboxylic acid-methyl-ester-3-n-butoxy-cholesta-2,4-diene.

EXAMPLE 32

*2-carboxylic acid-chloride-3-n-butoxy-cholesta-2,4-diene*

A suspension of 2-carboxylic acid-3-n-butoxy-cholesta-2,4-diene (4.84 parts) in benzene (10 parts) was treated with sodium-ehtylate (0.7 part) in ethanol (10 parts). The slurry was evaporated to dryness, treated with benzene and again evaporated to dryness. The thus obtained solid product was slurried at 0° C. in a solution of 4 parts of oxalyl chloride in 20 parts of anhydrous benzene, kept at the above temperature for 10 minutes, then at 20° C. for 30 minutes. The slurry was filtered and the filtrate was evaporated to dryness to give 2-carboxylic acid-chloride-3-n-butoxy-cholesta-2,4-diene (4.9 parts).

EXAMPLE 33

*2-carboxylic acid chloride-3-ethoxy-androsta-2,4-diene-17β-ol*

Following the procedure of Example 32, 2-carboxylic acid-chloride-3-ethoxy-androsta-2,4-diene - 17β - ol (2.78 parts) was obtained from 2-carboxylic acid-3-ethoxy-androsta-2,4-diene-17β-ol (2.8 parts).

EXAMPLE 34

*2-carboxylic acid-chloride-3-n-butoxy-androsta-2,4-diene-17β-ol-17-acetate*

2 - carboxylic acid chloride-3-n-butoxy-androsta-2,4-diene-17β-ol-17-acetate (4.65 parts) was obtained from 2 - carboxylic acid-3-n-butoxy-androsta-2,4-diene-17β-ol-17-acetate (4.6 parts), following the procedure of Example 32.

EXAMPLE 35

*2-carboxylic acid-chloride-3-n-butoxy-estra-2,4-diene-17β-ol*

2 - carboxylic acid-chloride-3-n-butoxy-estra-2,4-diene-17β-ol (3.82 parts) was obtained from 2-carboxylic acid-3-n-butoxy-estra-2,4-diene-17β-ol (4.1 parts), following the procdure of Example 32.

EXAMPLE 36

*2-carboxylic acid-chloride-3-n-butoxy-17α-methyl-androsta-2,4-diene-17β-ol*

Following the process of Example 32, 2-carboxylic acid - chloride - 3 - n - butoxy - 17α - methyl - androsta-2,4-diene-17β-ol (5.37 parts) was obtained from 2-carboxylic acid - 3 - n - butoxy - 17α - methyl - androsta-2,4-diene-17β-ol (6.8 parts).

EXAMPLE 37

*2-carboxylic acid-amide-3-n-butoxy-cholesta-2,4-diene*

A solution of 5.0 parts of 2-carboxylic acid chloride-3-n-butoxy-cholesta-2,4-diene in anhydrous benzene (50 parts) was added dropwise during one hour to benzene (80 parts) on a water-bath, a stream of NH$_3$ being passed through the solution during the addition and continued for 20 minutes thereafter. The solution was washed with water and evaporated to dryness; after crystallization, 2-carboxylic acid-amide-3-n-butoxy-cholesta - 2,4 - diene (4.4 parts) was obtained.

EXAMPLE 38

*2-carboxylic acid amide-3-n-butoxy-estra-2,4-diene-17β-ol*

Following the method described in Example 37, 2-carboxylic acid amide-3-n-butoxy-estra-2,4-diene-17β-ol (3.1 parts) was obtained starting from 2-carboxylic acid chloride-3-n-butoxy-estra-2,4-diene-17β-ol (4.2 parts).

EXAMPLE 39

*2-carboxylic acid amide-3-ethoxy-androsta-2,4-diene-17β-ol*

Following the method described in Example 37, 2-carboxylic acid amide-3-ethoxy-androsta-2,4-diene-17β-ol (5.18 parts) was obtained from 2-carboxylic acid chloride-3-ethoxy-androsta-2,4-diene-17β-ol (6.2 parts) as starting material.

EXAMPLE 40

*2-carboxylic acid amide-3-n-butoxy-17α-methyl-androsta-2,4-diene-17β-ol*

Following the procedure of Example 37, 2-carboxylic acid amide-3-n-butoxy-17α-methyl-androsta - 2,4 - diene-17β-ol (2.1 parts was obtained from 2-carboxylic acid chloride - 3 - n - butoxy - 17α - methyl - androsta - 2,4-diene-17β-ol (3.2 parts).

EXAMPLE 41

*2-(carboyl-isothiocyanate)-3-n-butoxy-cholesta-2,4-indene*

2-carboxylic acid chloride-3-n-butoxy-chloesta-2,4-diene (2.52 parts) in dry acetonitrile (75 parts) was shaken with freshly dried potassium thiocyanate (0.53 part) for 3 hours, then filtered from potassium chloride, and the orange filtrate distilled in vacuo, to give pale yellow 2-(carboyl - isothiocyanate) - 3-n-butoxy-cholesta-2,4-diene (2.12 parts).

EXAMPLE 42

*2-(carboyl-isothiocyanate)-3-ethoxy-androsta-2,4-diene-17β-ol*

Following the procedure of Example 41, 2-(carboyl-isothiocyanate) - 3 - ethoxy - androsta-2,4-diene-17β-ol (5.3 parts) was obtained from 2-carboxylic acid chloride-3-ethoxy-androsta-2,4-diene-17β-ol (6 parts).

EXAMPLE 43

*2-(carboyl-isothiocyanate)-3-n-butoxy-androsta-2,4-diene-17β-ol-17-acetate*

Following the method of Example 41, 2-(carboyl-isothiocyanate) - 3 - n - butoxy-androsta-2,4-diene-17β-ol-17-acetate (2.76 parts) was obtained from 2-carboxylic acid chloride - 3 - n - butoxy-androsta - 2,4 - diene-17β-ol-17-acetate (3.1 parts).

EXAMPLE 44

*2-(carboyl-isothiocyanate)-3-n-butoxy-estra-2,4-diene-17β-ol*

Following the method of Example 41, 4.73 parts of 2 - (carboyl - isothiocyanate)-3-n-butoxy-estra-2,4-diene-17β-ol were obtained from 2-(carboxylic acid chloride) 3-n-butoxy-estra-2,4-diene-17β-ol (5.1 parts).

EXAMPLE 45

*2-(carboyl-isothiocyanate)-3-n-butoxy-17α-methyl androsta-2,4-diene-17β-ol*

Following the method described in Example 41, 2-(carboyl - isothiocyanate) - 3 - n-butoxy-17α-methyl-androsta-2,4-diene-17β-ol (3.12 parts) was obtained from 2-carboxylic acid chloride-3-n-butoxy-17α-methyl-androsta-2, 4-diene-17β-ol (3.75 parts).

EXAMPLE 46

*2-(carboyl-isocyanate)-3-n-butoxy-cholesta-2,4-diene*

2-carboxylic acid chloride-3-n-butoxy-cholesta-2,4-diene- (2.50 parts) in dry acetonitrile (75 parts) was shaken with freshly dried potassium cyanate (0.48 part) for 3 hours, then filtered from potassium chloride and the filtrate was distilled in vacuo, to give 2-(carboyl-isocyanate)-3-n-butoxy-cholesta-2,4-diene (2.2 parts).

EXAMPLE 47

*2-(carboyl-isocyanate)-3-n-butoxy-17α-methyl-androsta-2,4-diene-17β-ol*

2 - (carboyl - isocyanate) - 3 - n - butoxy - 17α - methyl-androsta-2,4-diene-17β-ol (3.12 parts) was obtained from 2-carboxylic acid chloride-3-n-butoxy-17α-methyl-androsta-2,4-diene-17β-ol (3.5 parts), following the procedure of the above example. The following compounds:

(1) 2 - (carboyl - isocyanate) - 3 - ethoxy - androsta - 2,4-diene-17β-ol;
(2) 2 - (carboyl - isocyanate) - 3 - n - butoxy -androsta-2,4-diene-17β-ol-17-acetate;
(3) 2 - (carboyl-isocyanate) - 3 - n - butoxy - estra - 2,4-diene-17β-ol; were similarly obtained from the corresponding 2-carboxylic acid chloride-3-enol ethers.

EXAMPLE 48

*N-2-(3-n-butoxy-cholesta-2,4-diene)-carboyl-thiourea*

2 - (carboyl - isothiocyanate) - 3 - n - butoxy - cholesta-2,4-diene (0.525 part) in anhydrous ether (50 parts) was treated with 3.4 N methanolic ammonia (3 parts) and N-2-(3-n-butoxy-cholesta-2,4-diene)-carboyl-thiourea (0.475 part) was obtained.

EXAMPLE 49

*N-2-(3-n-butoxy-cholesta-2,4-diene)-carboyl-N'-butyl-thiourea*

2 - (carboyl - isothiocyanate) - 3 - n - butoxy - cholesta-2,4-diene (0.70 part) in anhydrous ether (60) parts were treated with n-butylamine (0.15 part) in ether; N-2-(3 - n - butoxy - cholesta - 2,4 - diene)-carboyl-N'-butyl-thiourea (0.52 part) was obtained.

EXAMPLE 50

*N-2-(3-n-butoxy-cholesta-2,4-diene)-carboyl-N'-(2',3',5'-tri-O-benzoyl-β-D-ribofuranosyl)-thiourea*

2 - (carboyl - isothiocyanate) - 3 - n - butoxy - cholesta-2,4-diene (1.05 parts) in ethyl ether (60 parts) was treated with 2', 3', 5'-tri-O-benzoyl-β-D-ribofuranosyl-amine (0.94 part) in ethyl ether (15 parts). After quite a vigorous reaction 1.12 parts of N-2-(3-n-butoxy-cholesta - 2,4 - diene) - carboyl - N' - (2',3',5', - tri - O - benzoyl-β-D-ribofuranosyl)thiourea were obtained.

EXAMPLE 51

*N-2-(3-n-butoxy-estra-2,4-diene-17β-ol)-carboyl-N'-ethyl-thiourea*

2 - (carboyl - isothiocyanate) - 3 - n - butoxy - estra-2,4-diene-17β-ol (0.52 part) in anhydrous ethyl ether (25 parts) was treated with 3.5 N ethylamine in ethanol (3 parts). N-2-(3-n-butoxy-estra-2,4-diene-17β-ol)-carboyl-N'-ethyl-thiourea (0.38 part) was obtained.

EXAMPLE 52

*N-2-(3-n-butoxy-17α-methyl-androsta-2,4-diene-17β-ol)-carboyl-N'-methylthiourea*

To a solution of 2(carboyl-isothiocyanate)-3-n-butoxy-17α-methyl-androsta-2,4-diene-17β-ol (2 parts) in ether (30 parts) was added 0.5 part of 33% methanolic methylamine. The solution was evaporated to dryness and by crystallization from methanol-ether, N-2-(3-n-butoxy-17α - methyl - androsta - 2,4 - diene - 17β - ol) - carboyl-N'-methyl-thiourea (1.26 parts) was obtained.

EXAMPLE 53

*N-2-(3-ethoxy-androsta-2,4-diene-17β-ol)-carboyl-N'-3', 5'-di-O-benzoyl-2'-deoxy-β-D-ribofuranosyl-thiourea*

2 - (carboyl - isothiocyanate) - 3 - ethoxy - androsta-2,4-diene-17β-ol (0.63 part) was treated with ether (50 parts) containing 3,5-di-O-benzoyl-2-deoxy-β-D-ribofuranosyl-amine (0.58 part) dissolved therein; after a night at room temperature, 0.59 part of N-2-(3-ethoxy-androsta-2,4 - diene - 17β - ol) - carboyl - 3',5' - di - O - benzoyl-2'-deoxy-β-D-ribofuranosylthiourea were obtained.

EXAMPLE 54

*N - 2-(3-n-butoxy-androsta-2,4-diene-17β-ol-17-acetate)-carboyl - N'-(2',3',5'-tri-O-benzoyl-β-D-ribofuranosyl)-thiourea*

2 - (carboyl - isothiocyanate)-3-n-butoxy-androsta-2,4-diene-17β-ol-17-acetate (0.92 part) in ethyl ether (50 parts) was treated with 2',3',5'-tri-O-benzoyl-β-D-ribofuranosyl-amine (0.98 part) in ether (17 parts); after vigorous stirring, N-2-(3-n-butoxy-androsta-2,4-diene-17β - ol - 17-acetate)-carboyl-N'-(2',3',5'-tri-O-benzoyl-β-D-ribofuranosyl)-thiourea (0.86 part) was obtained.

EXAMPLE 55

*N - 2-(androst-4-ene-3-one-17β-ol-17-acetate)-carboyl-N'-(2',3',5'-tri-O-benzoyl-β-ribofuranosyl)-thiourea*

A solution of N-2-(3-n-butoxy-androsta-2,4-diene-17β-ol - 17 - acetate) - carboyl-N'-(2',3',5'-tri-O-benzoyl-β-D-ribofuranosyl-thiourea (0.22 part) in 80% acetic acid (4 parts) was heated on a water-bath for 10 minutes; after water dilution, the precipitate was filtered and crystallized from methanol-ethyl ether. N-2-(androst-4-ene-3-one-17β - ol - 17-acetate)-carboyl-N'-(2',3',5'-tri-O-benzoyl-β-D-ribofuranosyl)-thiourea (0.12 part) was obtained.

EXAMPLE 56

*N - 2-(3-n-butoxy-cholesta-2,4-diene)-carboyl-N'-(2',3',5'-tri-O-benzoyl-β-D-ribofuranosyl)-urea*

To a solution of 2-(carboyl-isocyanate)-3-n-butoxy-cholesta-2,4-diene (0.5 part) in ethyl ether (50 parts) was added 2,3,5-tri-O-benzoyl-β-D-ribofuranosyl-amine (0.45 part) in ether (30 parts). After 24 hours, N-2-(3-n-butoxy - cholesta - 2,4-diene)-carboyl-N'-(2',3',5'-tri-O-benzoyl-β-D-ribofuranosyl)-urea (0.62 part) was obtained.

EXAMPLE 57

*N - 2-(3-n-butoxy-androsta-2,4-diene-17β-ol)-carboyl-N'-(3',5'-di-O-benzoyl-β-D-2'-deoxy-ribofuranosyl)-urea*

2 - (carboyl-isocyanate)-3-n-butoxy-androsta-2,4-diene-17β-ol (0.59 part) was treated with 3,5-di-O-benzoyl-2-deoxy-β-D-ribofuranosyl-amine (0.60 part) in ether (52 parts). After a night, N-2-(3-n-butoxy-androsta-2,4-diene - 17β - ol)-carboyl-N'-(3',5'-di-O-benzoyl-β-D-2'-deoxy-ribofuranosyl)-urea (0.73 part) was obtained.

EXAMPLE 58

*N - 2-(3-n-butoxy-17α-methyl-androsta-2,4-diene-17β-ol)-carboyl-N'-methyl-urea*

To a solution of 2-(carboyl-isocyanate)-3-n-butoxy-17α-methyl-androsta-2,4-diene-17β-ol (0.56 part) in ether (20 parts), 2 parts of 33% methanolic-methylamine were added. After 6 hours, the thus obtained solution was evaporated to dryness and crystallized from methanol, obtaining thereby N-2-(3-butoxy-17α-methyl-androsta-2,4-diene-17β-ol)-carboyl - N' - methyl - urea (0.48 part).

EXAMPLE 59

*N - 2-(3-n-butoxy-androsta-2,4-diene-17β-ol-17-acetate)-carboyl-N'-n-pentyl-urea*

A solution of 2-(carboyl-isocyanate)-3-n-butoxy-androsta-2,4-diene-17β-ol-17-acetate (0.47 part) in benzene (30 parts) was refluxed with pentylamine (2 parts) in benzene (15 parts). The mixture was evaporated to dryness and by crystallization from methanol, 0.51 part of N-2-(3-n-butoxy-androsta-2,4-diene-17β-ol - 17 - acetate)-carboyl-N'-n-pentyl-urea was obtained.

EXAMPLE 60

*N-2-(androst-4-ene-3-one-17β-ol-17-acetate)-carboyl-N'-pentyl-urea*

A solution of N-2-(3-n-butoxy-androsta-2,4-diene-17β-ol-17-acetate)-carboyl-N'-pentyl-urea (0.3 part) in 85% acetic acid (4 parts) was heated on a water bath for 15 minutes. The solution was diluted with water and, after filtering and crystallizing from methanol, N-2-(androst-4-ene-3-one-17β-ol-17-acetate)-carboyl-N' - pentyl - urea (0.18 part) was obtained.

EXAMPLE 61

*3,3-ethylenedioxy-2α-cyano-5α-androstane-17β-ol*

2α-cyano-5α-androstane-17β-ol-3-one (40 parts) in benzene (1500 parts) was refluxed with ethylene glycol (46 parts) for 16 hours, along with p-toluenesulphonic acid (1.2 parts), the water being continuously removed. Pyridine (6 parts) was added, then the mixture was washed with water and evaporated to dryness. After crystallization from acetone, 3,3-ethylenedioxy-2α-cyano-5α-androstane-17β-ol- (33.8 parts) was obtained, M.P. 232–234° C.

EXAMPLE 62

*3,3-ethylenedioxy-2α-cyano-5α-androstane-17-one*

3,3 - ethylenedioxy-2α-cyano-5α-androstane-17β-ol (20 parts) was dissolved in dimethylformamide (380 parts) and acetone (20 parts), cooled to 2° C., and 40 parts of Jone's reagent were added thereto in 5 minutes, with stirring; then the mixture was kept at 5° C. for 5 minutes. It was diluted with water and filtered; by crystallization from acetone 3,3-ethylenedioxy-2α-cyano-5α-androstane-17-one (14 parts) was obtained, M.P. 239–242° C.

EXAMPLE 63

*2α-acetyl-3,3-ethylenedioxy-5α-androstane-17β-ol*

To a solution of 3,3-ethylenedioxy-2α-cyano-5α-androstane-17β-ol (5 parts) in anhydrous anisole (80 parts) was added a 32.68% ethereal solution of methyl-magnesium bromide (80 parts). When the ether was evaporated, the solution was kept for 20 hours at 95° C. The mixture was treated with NH₄Cl, steam-distilled and extracted with methylene chloride; the solution was evaporated to dryness. By crystallization from methanol, 2α-acetyl-3,3-ethylenedioxy-5α-androstane-17β-ol (3.5 parts) was obtained, M.P. 221–223° C., $(\alpha)_D = -6°$ (chloroform).

EXAMPLE 64

*2α-acetyl-3,3-ethylenedioxy-17α-methyl-5α-androstane-17β-ol*

Following the procedure of Example 63, except that 2α-cyano-3,3-ethylenedioxy-5α-androstane - 17 - one (3 parts) was used, 2α-acetyl-3,3-ethylenedioxy-17α-methyl-5α-androstane-17β-ol (2.2 parts) was obtained; M.P. 177–178.5° C.; $(\alpha)_D = -18°$ (chloroform).

EXAMPLE 65

*2α-carboxylic acid-methylester-5α-androstane-17β-ol-3-one*

To a solution of 3,3-ethylenedioxy-2-α-cyano-5α-androstane-17β-ol (25 parts) in ethylene glycol (300 parts) were added 75 parts of potassium hydroxide in 75 parts of water, and the mixture was refluxed for 40 hours; then it was diluted with water, filtered and the filtrate was acidified. The crude acid was precipitated, and, after filtering and crystallizing from ethyl ether, 2α-carboxylic acid-3,3-ethylenedioxy-5α-androstane-17β-ol (20 parts) was obtained, M.P. 229–233° C. The above compound was suspended in 400 parts of benzene and a 2% of diazomethane ethereal solution (160 parts) was added. After a night at room temperature, the solvent was evaporated and the residue crystallized from MeOH, 3,3-ethylenedioxy-2,2-carboxylic acid - methylester-5α-androstane-17β-ol (20.2 parts) being obtained, M.P. 179–180° C. The above compound was de-ketalized by heating its solution in 90% acetic acid (300 parts) on a water bath for 2 hours. After dilution with water, filtration and crystallization from methanol, 2-carboxylic acid-methylester-5α-androstane-17β-ol-3-one (13 parts) was obtained, M.P. 184–186° C.; $(\alpha)_D = +69°$ (chloroform).

EXAMPLE 66

*2α-carboxylic acid-3,3-ethylenedioxy-5α-androstane-17β-ol-17-acetate*

2α - carboxylic acid-3,3-ethylenedioxy-5α-androstane-17β-ol (1.6 parts) was dissolved in pyridine (8 parts) and acetic anhydride (4 parts), and allowed to stand for 24 hours 2α-carboxylic acid - 3,3 - ethylenedioxy-5α-androstane-17β-ol-17-acetate (1.62 parts) was obtained through dilution with water and crystallization from ethyl ether.

EXAMPLE 67

*3,3-ethylenedioxy-2α-cyano-cholestane*

Following the process described in Example 55, except that 2-cyano-cholestane-3-one (25 parts) was used, 3,3-ethylenedioxy-2α-cyano-cholestane (22 parts) was obtained, M.P. 163–166° C.

EXAMPLE 68

*2-carboxylic acid-methyl-ester-3-methoxy-5α-androst-2-ene-17β-ol*

To a solution of 2-carboxylic acid-methyl-ester-5α-androstane-3-one-17β-ol (2 parts) in 20 parts of ethyl ether, containing a BF$_3$-etherate solution (4 parts), was added a diazomethane ethereal solution (10 parts). After 6 hours at room temperature, and after washing with water and with an aqueous dilute sodium-bicarbonate solution, the mixture was evaporated to dryness, to obtain 2-carboxylic acid-methylester - 3 - methoxy-5α-androst-2-ene-17β-ol (1.75 parts).

EXAMPLE 69

*2-carboxylic acid-methylester-3-methoxy-cholest-2-ene*

2-carboxymethyl-ester-cholestane-3-one (R. A. Nelson and R. N. Schutz, J.A.C.S. 80, 6630, 1958) (5 parts), treated according to the above example, gave 2-carboxylic acid-methylester-3-methoxy-cholest-2-ene (4.12 parts).

EXAMPLE 70

*2-carboxylic acid-methylester-3-ethoxy-17α-methyl-androst-2-ene-17β-ol*

Following the process described in Example 68, except that 2-carboxylic acid-methyl-ester-17α-methyl-5α-androstane-3-one (5 parts) and diazoethane were used, 2-carboxylic acid-methylester-3-ethoxy-17α-methyl-5α-androst-2-ene-17β-ol (4.8 parts) was obtained.

EXAMPLE 71

*2-carboxylic acid-methylester-3-n-butoxy-5α-androst-2-ene-17β-ol*

2-carboxylic acid - methyl-ester-5α-androstan-17β-ol-3-one (1.2 parts) in toluene (30 parts) was refluxed for 6 hours with n-butanol (1.7 parts) and p-toluenesulphonic acid (0.027 part), the water being removed. The mixture was neutralized with pyridine (1 part) and after several washings with water and alkali, it was evaporated to dryness, thereby obtaining 2-carboxylic acid-methyl-ester-3-n-butoxy-5α-androst-2-ene-17β-ol (0.97 part).

EXAMPLE 72

*2-carboyl-isothiocyanate-3-ethoxy-17α-methyl-5α-androst-2-ene-17β-ol*

To 2-carboxylic acid-ethylester-3-ethoxy-17α-methyl-5α-androst-2-ene-17β-ol (8 parts) in anhydrous ethanol (10 parts) was added sodium ethoxide (1.45 parts) and the mixture was kept at room temperature for 2 hours. The mixture was evaporated to dryness and treated several times with anhydrous benzene, the suspension of the sodium salt of 3-ethoxy-17α-methyl-5α-androst-2-ene-17β-ol-2-carboxylic acid being evaporated to dryness each time. The salt was then slurried in anhydrous benzene (30 parts), then oxalyl chloride (6.2 parts) was added thereto at 0° C. After 20 minutes at room temperature, the slurry was filtered and the filtrate was evaporated to dryness to give 2-carboxylic acid-chloride-3-ethoxy-17α-methyl-5α-androst-2-ene-17β-ol (7.2 parts). This latter compound was suspended in anhydrous acetonitrile (40 parts), anhydrous potassium isothiocyanate (2.2 parts) was added, and the slurry was stirred at room temperature for 3 hours. After filtering to remove salts, the solution was evaporated and 2-carboyl-isothiocyanate-3-ethoxy-17α-methyl-5α-androst-2-ene-17β-ol (7.1 parts) was obtained.

EXAMPLE 73

*2-carboyl-iso-cyanate-3-ethoxy-17α-methyl-5α-androst-2-ene-17β-ol*

Following the process of the above example, except that 2-carboxylic acid-chloride-3-ethoxy-17α-methyl-5α-androst-2-ene-17β-ol (3.5 parts) and potassium cyanate were used, 2-carboyl-isocyanate-3-ethoxy-17α-methyl-5α-androst-2-ene-17β-ol (2.6 parts) was obtained.

EXAMPLE 74

*N-2α-(3,3-ethylenedioxy-5α-androstane-17β-ol-17-acetate)-carboyl-urea and N-butyl-urea*

To a solution of sodium methoxide (1.08 parts) in methanol, 3,3-ethylenedioxy - 5α - androstane-17β-ol-17-acetate-2α-carboxylic acid (8.4 parts) was added; after 5 minutes the solution was completed; it was evaporated to dryness and repeatedly treated with benzene, then evaporated to dryness under vacuum. The residue was slurried in benzene and oxalyl chloride (6 parts) was added at 0° C.; then the precipitate was filtered and the filtrate evaporated to dryness. 2α-carboxylic acid chloride (7.2 parts) was obtained, which was slurried in anhydrous acetonitrile (50 parts) and anhydrous potassium-cyanate (1.7 parts) was added. The separated potassium chloride was filtered and the filtrate was concentrated to dryness to obtain 2α-carboyl-isocyanate-3,3-ethylenedioxy-5α-androstane-17β-ol-17-acetate (7.05 parts). To this compound (3 parts) in anhydrous ethyl ether (15 parts), 5 parts of a saturated methanolic ammonia solution were added, thereby obtaining N-2α-(3,3-ethylenedioxy-5α-androstane-17β-ol-17-acetate)-carboyl - urea (2.8 parts). In a similar manner, N-2α-(3,3-ethylenedioxy-5α-androstane-17β-ol-17-acetate)-carboyl - N' - butylurea (2.6 parts) was obtained, starting from an etheral solution of 2α-carboyl-isocyanate-3,3-ethylenedioxy-5α-androstane-17β-ol-17-acetate (3 parts) with n-butyl-amine (2 parts).

EXAMPLE 75

*N-2-(5α-androstane-3-one-17β-ol-17-acetate)-carboyl-urea*

N -2 (3,3 - ethylenedioxy-5α-androstene-17β-ol-17-acetate)-carboyl-urea (1.2 parts) was heated with 90% acetic acid (4 parts). N-2-(5α-androstane-3-one-17β-ol-17-acetate)-carboyl-urea (0.72 part) was obtained after heating 10 minutes on a water bath, dilution with water and crystallization from methanol.

EXAMPLE 76

*N-2-(5α-androstane-3-one-17β-ol-17-acetate)-carboyl-N-'-butyl-urea*

Following the process of Example 75, except that N - 2α - (3,3-ethylenedioxy-5α-androstane-17β-ol-17-acetate)-carboyl-N'-butyl-urea (2.2 parts) was used as starting material, N-2-(5α-androstane-3 - one-17β-ol-17-acetate)-carboyl-N'-butyl-urea (1.63 parts) was obtained.

EXAMPLE 77

*N-2-(5α-androst-2-ene-3-butoxy-17β-ol-17-acetate)-carboyl-urea*

N - 2-(5α-androstane-3-one-17β-ol-17-acetate)-carboyl-urea (1.8 parts) in toluene (30 parts) along with butanol (3 parts) and p-toluene sulphonic acid (0.08 part) was boiled to remove water. After neutralization with pyridine, the mixture was washed with water, evaporated to dryness and the residue crystallized from methanol to obtain 1.12 parts of N-2-(5α-androst-2-ene-3-n-butoxy-17β-ol-17-acetate)-carboyl-urea.

EXAMPLE 78

*N-2-(3-n-butoxy-5α-androst-2-ene-17β-ol-17-acetate)-carboyl-N'-butyl-urea*

Following the process described in Example 77, except that N - 2 -(5α-androstane-3-one-17β-ol-17-acetate)-carboyl-N'-butyl-urea (4.1 parts) was used, N-2-(3-n-butoxy-5α-androst - 2 - ene-17β-ol-17-acetate)-carboyl-N'-butyl-urea (3.1 parts) was obtained.

EXAMPLE 79

*N - 2 - (3 - ethoxy - 17α-methyl-5α-androst-2-ene-17β-ol)-carboyl - N'-(2',3',5'-tri-O-benzoyl-β-D-ribofuranosyl)-thiourea.*

To a slurry of 2-carboyl-isothiocyanate-3-ethoxy-5α-androst-2-ene-17β-ol (2.1 parts) in anhydrous ethyl ether (40 parts) was added 2',3',5'-tri-O-benzoyl-β-D-ribofuranosylamine (2.5 parts). After 12 hours at room temperature, N - 2 -(3- ethoxy-17α-methyl-5α-androst-2-ene-17β-ol)-carboyl-N'-(2',3',5'-tri-O-benzoyl-β - D - ribofuranosyl)-thiourea (2.4 parts) was obtained.

EXAMPLE 80

*N - 2-(3 - ethoxy - 17α-methyl-5α-androst-2-ene-17β-ol)-carboyl - N' - 2',3',5'-tri-O-benzoyl-β-D-ribofuranosyl)-urea*

The process described in Example 79 was followed, except that 2-carboyl-isocyanate-3-ethoxy-17α-methyl-5α-androst-2-ene-17β-ol (1.8 parts) was used. N-2-(3-ethoxy - 17α-methyl-5α-androst-2-ene-17β-ol)-carboyl-N'-(2',3',5' - tri-O-benzoyl-β-D-ribofuranosyl)-urea (1.76 parts) was obtained.

EXAMPLE 81

*N-2-(3-ethoxy-17α-methyl-5α-androst-2-ene-17β-ol)-carboyl-N'-n-hexyl-thiourea*

To a slurry of 2-carboyl-isothiocyanate-3-ethoxy-5α-androst-2-ene-17β-ol (0.4 part) in benzene (30 parts), there was added n-hexyl-amine (0.3 part) in benzene (5 parts). The slury was kept at room temperature for 30 minutes, then at 60° C. for one hour. Then it was evaporated to dryness and crystallized from methanol to obtain N-2-(3-ethoxy-17α- methyl-5α-androst-2-ene - 17β-ol)-carboyl-N'-n-hexyl-thiourea (0.43 part).

EXAMPLE 82

*N-2-(3-ethoxy-17α-methyl-5α-androst-2-ene-17β-ol)-carboyl-urea*

To a slurry of 2 - carboyl - isocyanate-3-ethoxy-17α-methyl-5α-androst-2-ene-17β-ol (0.5 part) in 10 parts of ether, was added 3.8 N methanolic ammonia (2.5 parts). The solid was completely dissolved; thereafter N-2-(3-ethoxy-17α-methly-5α-androst-2-ene-17β-ol)-carboyl-urea (0.39 part) was obtained as a precipitate.

We claim:

1. A compound of the formula

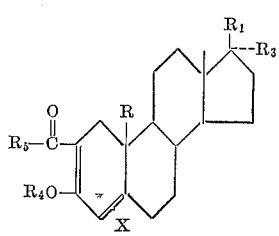

where R is a member selected from the group consisting of H and CH$_3$; R$_1$ is a member selected from the group consisting of OH, OR$_2$, R$_2$ being an acyl radical derived from an aliphatic acid of from 2 to 10 carbon atoms, and 2-methyl-isoheptyl; R$_3$ is a member selected from the group consisting of H and lower alkyl; R$_4$ is alkyl of from 1 to 4 carbon atoms; R$_5$ is a member selected from the group consisting of OH, OMe, OEt, CH$_3$, Cl, NH$_2$, CNS, CNO,

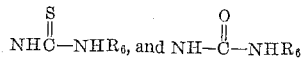

R$_6$ being a member selected from the group consisting of H, alkyl of from 1 to 6 carbon atoms, ribosyl, 2'-deoxyribosyl, 2',3',5'-tri-O-benzoyl-ribosyl and 3',5'-di-O-benzoyl-2'-deoxyribosyl; and X is a member selected from the group consisting of a single and a double bond.

2. A compound of the formula

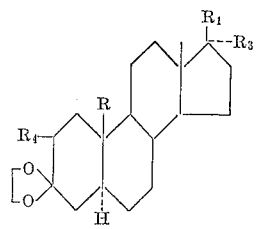

where R is a member selected from the group consisting of H and CH$_3$; R$_1$ is a member selected from the group consisting of OH, OR$_2$, R$_2$ being an acyl radical derived from an aliphatic acid of from 2 to 10 carbon atoms, and 2-methyl-isoheptyl; R$_3$ is a member selected from the group consisting of H and lower alkyl; and R$_4$ is a member selected from the group consisting of CN,

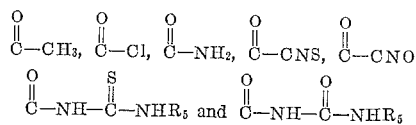

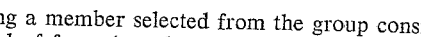

R$_5$ being a member selected from the group consisting of H, alkyl of from 1 to 6 carbon atoms, ribosyl, 2'-deoxyribosyl, 2',3',5'-tri-O-benzoyl-ribosyl and 3',5'-di-O-benzoyl-2'-deoxyribosyl.

3. A compound of the formula

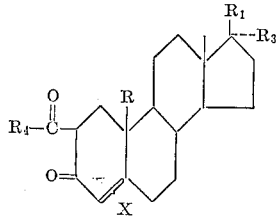

where R is a member selected from the group consisting of H and CH$_3$; R$_1$ is a member selected from the group consisting of OH, OR$_2$, R$_2$ being an acyl radical derived from an aliphatic acid of from 2 to 10 carbon atoms, and 2-methylisoheptyl; R$_3$ is a member selected from the group consisting of H and lower alkyl; R$_4$ is a member selected from the group consisting of Cl, CNS,

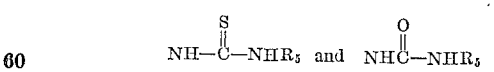

R$_5$ being a member selected from the group consisting of H, alkyl of from 1 to 6 carbon atoms, ribosyl, 2'-deoxyribosyl, 2',3',5'- tri-O-benzoyl-ribosyl and 3',5'-di-O-benzoyl-2'-deoxyribosyl; and X is a member selected from the group consisting of a single and a double bond.

References Cited by the Examiner

UNITED STATES PATENTS

| | | | |
|---|---|---|---|
| 3,062,843 | 11/1962 | Knox | 260—397.1 |
| 3,146,231 | 8/1964 | Dean | 260—239.55 |
| 3,153,647 | 10/1964 | Shapiro et al. | 260—239.55 |

ELBERT L. ROBERTS, *Primary Examiner.*

J. R. BROWN, *Assistant Examiner.*